United States Patent
Johri et al.

(10) Patent No.: US 8,990,181 B2
(45) Date of Patent: Mar. 24, 2015

(54) METHOD AND SYSTEM FOR TRANSFERRING DATA BETWEEN A HOST DEVICE AND AN EXTERNAL DEVICE

(75) Inventors: Lokesh Johri, San Jose, CA (US);
Sasikala Divakaruni, Chennai (IN);
Andrew Bartlett, Mill Valley, CA (US);
Richard W. Holbrook, Phoenix, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 1043 days.

(21) Appl. No.: 12/884,154

(22) Filed: Sep. 16, 2010

(65) Prior Publication Data
US 2012/0072401 A1    Mar. 22, 2012

(51) Int. Cl.
*G06F 17/30* (2006.01)
(52) U.S. Cl.
CPC .... *G06F 17/30091* (2013.01); *G06F 17/30241* (2013.01)
USPC .......................................... 707/705; 707/822
(58) Field of Classification Search
CPC ................... G06F 17/30241; G06F 17/30091
USPC ........... 707/705, 822, 704, 821; 711/170, 100
See application file for complete search history.

(56) References Cited

U.S. PATENT DOCUMENTS

| | | | | |
|---|---|---|---|---|
| 5,491,808 | A * | 2/1996 | Geist, Jr. ...................... | 711/100 |
| 5,544,356 | A * | 8/1996 | Robinson et al. ............. | 707/821 |
| 6,173,277 | B1 * | 1/2001 | Ashby et al. .................. | 707/704 |
| 6,879,266 | B1 * | 4/2005 | Dye et al. ...................... | 711/170 |
| 7,849,242 | B2 * | 12/2010 | Lee et al. ........................ | 710/74 |
| 2006/0089936 | A1 * | 4/2006 | Chalker ........................ | 707/10 |
| 2009/0091550 | A1 * | 4/2009 | Lim et al. ...................... | 345/173 |
| 2011/0153697 | A1 * | 6/2011 | Nickolov et al. ............. | 707/827 |

* cited by examiner

*Primary Examiner* — Shahid Alam
(74) *Attorney, Agent, or Firm* — King & Spalding L.L.P.

(57) ABSTRACT

A method for transferring data between a host device and an external device is described. The external device has FAT32 file system. The method accepts parameters for an incoming data file from the host device. Further, the method allocates memory blocks for the incoming file data on the external device based on the parameters and indexes the allocated memory blocks on a memory index table to create a file footprint. The method reads the memory index table to identify the file footprint and receives the incoming file data from the host device.

17 Claims, 3 Drawing Sheets

METHOD AND SYSTEM FOR TRANSFERRING DATA BETWEEN A HOST DEVICE AND AN EXTERNAL DEVICE

BACKGROUND

This application deals generally with the field of data transfer, and more specifically with optimal data transfer between devices.

Recent years have observed an increasing demand for portable devices such as cell phones, personal digital assistants, media players, and the like. Most of these portable devices include one or more memory media such as internal memory, memory sticks, and the like. In order to remain compatible with each other, most of these devices come pre-formatted with the FAT32 file system. The portable devices having such memory media exhibit a slow data transfer rate when receiving data from a host computer. Slow data transfer may be acceptable for conventional procedures such as data backup, or data archiving, but is detrimental when a significant amount of data needs to be synchronized with the host computer. For example, transferring 1 GB of data from a personal computer to an mp3 player may take about 2 minutes with a data transfer rate of 8 mbps (megabytes per second). Further, this problem increases when using high-capacity storage media or synchronizing large amount of data.

Available solutions like Direct Memory Access (DMA) speed up the data transfer but only when used to transfer data to a "Sparse File," a special file that does not require initializing. Unfortunately, this requirement renders DMA ineffective on FAT32, because FAT32 does not support direct sparse file creation. In FAT32, indirect sparse file creation involves writing zeros to the pre-allocated memory blocks, which imposes a major overhead before any data is transferred.

While there have been recent developments in optimizing memory pre-allocation techniques for the portable devices, there is a need in the art where the file system limitations are overcome by co-operation between the kernel/file system and the portable devices.

As FAT32 is the file system on most of the portable devices, it would be highly desirable to have a simple and effective mechanism for enabling fast data transfer using DMA techniques in the FAT32 file system.

SUMMARY

The present disclosure describes a method for transferring data between a host device and an external device having a FAT32 file system. The method accepts parameters for an incoming data file from the host device. Further, the method allocates memory blocks for the incoming file data on the external device based on the parameters and indexes the allocated memory blocks on a memory index table to create a file footprint. The method reads the memory index table to identify the file footprint and receives the incoming file data from the host device into the file footprint.

Another embodiment of the present disclosure describes a data transferring system for an external device having a FAT32 file system. The system includes a memory management module and a data transfer module. The memory management module accepts parameters for an incoming data file and allocates memory blocks for the incoming file data, based on the parameters. Further, the memory management module indexes the allocated memory blocks on a memory index table to create a file footprint. The data transfer module reads the memory index table to identify the file footprint and receives the incoming file data into the file footprint.

BRIEF DESCRIPTION OF THE DRAWINGS

The drawings described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

Figure 1:
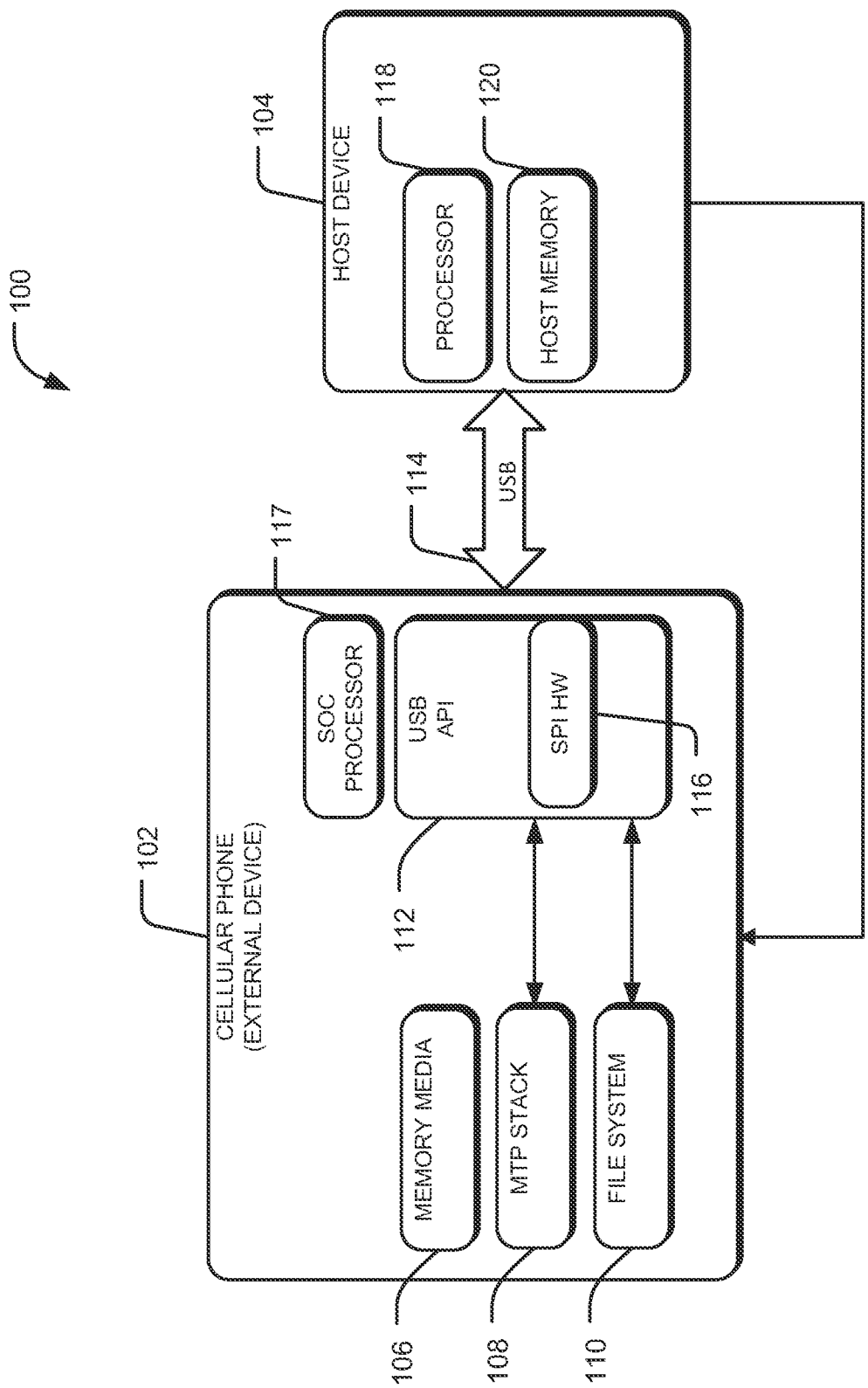
FIG. 1 illustrates a prior art of an exemplary system for transferring data.

The following detailed description is made with reference to the figures. Exemplary embodiments are described to illustrate the subject matter of the disclosure, not to limit its scope, which is defined by the appended claims.

Overview

The present disclosure describes methods and systems for transferring data between a host device and an external device having a FAT32 file system. The disclosed method accepts parameters for an incoming data file from the host device. Further, the method pre-allocates memory blocks for the incoming file data on the external device based on the parameters and indexes the allocated memory blocks on a memory index table to create a file footprint by creating an index entry for the data file that will be transferred. A file footprint is a file shadow or a file impression that represents the indexed memory blocks that may be used for transferring data without actually initializing the memory locations with zeros as in case of a sparse file. The memory locations are indexed in a similar manner as in case of any other file. The method reads the memory index table to identify the file footprint and receives the incoming file data from the host device in the file footprint. File footprint creation mimics the operation of creating a sparse file without going through the memory blocks initialization steps, speeding-up the data transfer. Specifically, the methods and systems of the present disclosure illustrate extensions to the FAT32 file system, effectively allowing creation of the file footprints on the external device while avoiding both modifying the external device's system kernel or introducing new system calls. The disclosed methods and systems overload the existing kernel system calls read( ), ioctl( ), and fallocate( ). As the kernel remains unchanged and the existing FAT32 file system drivers remain the same, the driver functions without any changes when operating outside the explained data transfer context.

Definitions

The following terms are used throughout the disclosure and are defined here for clarity and convenience.

Sparse File: A file containing large sections of data composed only of zeros, which is marked as such in modern file systems, e.g., NTFS. While reading the non-allocated portions of the file, the file system automatically returns zeros to the caller.

Sideloading: Data transfer between a personal computer and a mobile device such as a cell phone, Smartphone, PDA, or portable media player.

Handshaking: An automated process of negotiation for dynamically setting parameters of a communication channel established between two devices before the communication.

Secure Digital (SD): A non-volatile memory card format used in portable devices such as, digital cameras, media players, mobile phones, GPS receivers, and video games. Most of the SD cards are pre-formatted with FAT32 or other FAT file systems.

Application Programming Interface (API): An interface implemented by a software program, which enables it to interact with other software, facilitating interaction between different software programs. An API is implemented by applications, libraries, and operating systems to determine their vocabularies and calling conventions, and is used to access their services. For example, an API can call a function or a subroutine.

Overloading: A feature of various programming languages that allows the creation of several functions or methods with the same name, which differ from each other in terms of input parameters and the output type.

External Device: A portable computing device, such as, cellular or mobile phone (including Smartphone), PDA, digital camera, portable media player, or other similar device. In general, the term "external device" encompasses devices that include at least one processor that executes instructions from a memory medium (may be an SD card) and is easily portable.

Host Device: A personal computing device, such as a computer having one or more memory media, input devices, one or more processing units, and a visual display. Additionally, the host device can be a USB device.

Exemplary Operating Environment

FIG. 1 illustrates a prior art of an exemplary system 100 for transferring data. The system 100 depicts the flow of data to a cellular phone (external device) 102 from a host device 104. Data transfer between the cellular phone 102 and the host device 104 can be performed via DMA, by establishing a physical connection between the two devices. When performing DMA, data between a personal computer and its peripheral devices is transferred without any processor (such as CPU) intervention. Further, the data transfer follows MTP protocols. MTP indicates a protocol accompanying a set of drivers developed by Microsoft™ to connect portable devices to a personal computer (PC), and synchronize digital media content between the devices and the PC. In an embodiment of the system 100, the host device 104 can be an MTP initiator, and memory media 106 of the cellular phone 102 can be an MTP responder.

The cellular phone 102 includes an MTP stack 108, a file system driver 110, and a USB API 112, which includes API functions for performing various data transferring tasks. The MTP stack 108 processes all MTP commands by splitting the MTP packets between header and data. The MTP stack processes the header, and the data is written to the memory media 106, facilitated by appropriate modification of the MTP Stack 108 and the file system driver 110. The cellular phone 102 includes a USB chip that receives data using a USB connection 114 from the host device 104. Further, the cellular phone 102 includes SPI hardware 116 for SPI communication with a system-on-chip (SoC) processor 117 of the cellular phone 102.

The host device 104 includes processor 118, and a host memory 120 operating in a manner known in the art. The host device 104 sends a control signal to the cellular phone 102, indicating that the host device 104 is ready for data transfer. Further, the host memory 120 includes a data file that needs to be transferred to the cellular phone 102.

Following successful connection, the two devices recognize that they are synchronizing via MTP through a handshaking process where the processor on the host device 104 informs the SoC 117 about the data file's parameters. Further, the SoC 117 performs memory management for the cellular phone 102. The host device 104 may request the memory management data from the SoC 117, which then provides the memory management data to the host device 104 for initiating the data transfer to the cellular phone 102.

The data transfer speed in the system 100 is slow when transferring data files from the host device 104 to the cellular phone 102 as the DMA transfer requires an existing empty file on the memory media 106 for transferring data. The SoC 117's memory management module cannot provide the empty file's parameters to the host device 104 before the empty file is created that involves writing zeros to memory blocks on the memory media 106, which is time consuming, making the data transfer a slow process.

Specific Description Sections

Figure 2:
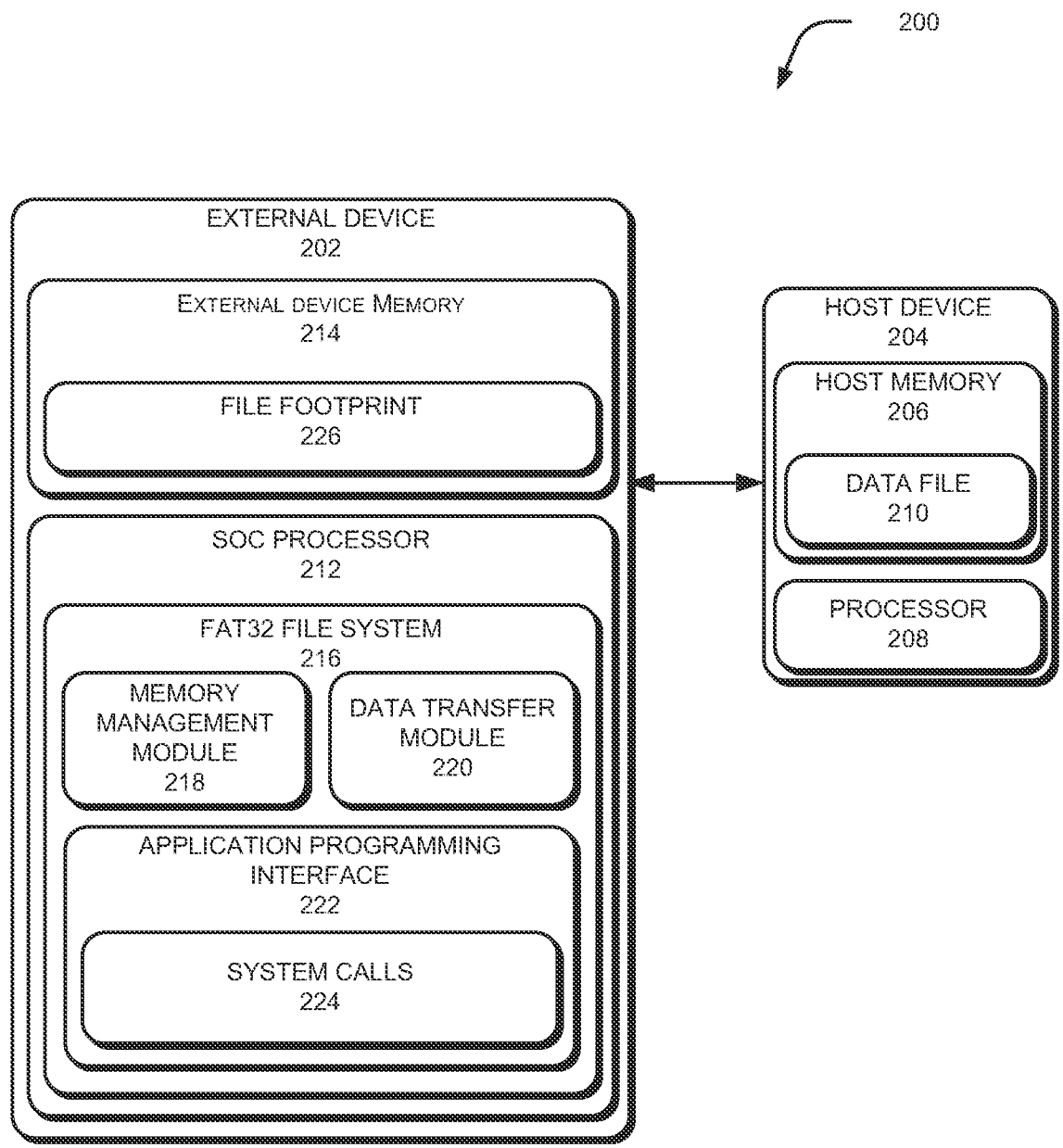
FIG. 2 depicts an exemplary system operable to allow a high-speed data transfer between a host device and an external device.

FIG. 2 depicts an exemplary system 200 operable to allow a high-speed data transfer between an external device 202 and a host device 204. Both the devices are connected in a similar connection, as indicated above in the system 100 of the present disclosure.

The host device 204 includes a host memory 206 and a host processor 208. Further, the host memory 206 may have multiple data files and data management units. Additionally, the host device 204 includes a data file 210, which is to be transferred to the external device 202.

In some embodiments of the present disclosure, the external device 202 may be a USB device. The host device 204 may be a computer system, which may include input devices and a display. The external device 202 may include a SoC processor 212 and one or more external device memory media 214. The external device memory media 214 may only be accessible by the SoC processor 212. The host processor 208, however may access the external device memory media 214 via the SoC processor 212 in MTP mode. The external device 202 may be coupled to the host device 204 via a hub, possibly a USB hub or a USB cable, or other similar connection known in the art. As employed in several embodiments, the host device 204 may be a USB device or any of various appropriate devices.

The external device memory media 214 may be a high-speed flash memory. Further, the external device memory media 214 includes FAT32 file system 216 including a memory management module 218 and a data transfer module 220. The memory management module 218 accepts one or more parameters related to the incoming data file 210 from the host device 204. The parameters may include filename, size, type, creation date, author or any other similar parameter related to the incoming data file.

Furthermore, the external device memory media 214 includes an API block 222 that may help in invoking system calls from a system call block 224. The API block 222 and the system call block 224 may include multiple APIs and system calls.

The memory management module 218 allocates memory blocks for the incoming data of the data file 210 on the external device memory media 214 based on the parameters. Besides, the allocated memory blocks are indexed on a memory index table to create a file footprint 226 in the external device memory media 214.

A non-standard implementation of a system call fallocate( ) from the system call block 224 calculates the number of disk clusters as explained in detail in a following method 300 of the present disclosure. The fallocate( ) system call is not called directly but through an API from the API block 222, which calls fallocate( ) in a non-standard mode and reserves the memory blocks.

The driver of the FAT32 file system 216 includes the file distribution or sector information on the external device memory media 214, which reads the memory index table to identify the freshly created file footprint 226. Specifically, the data transfer module 220 accesses the sector/cluster mappings for the file footprint 226 via a non-standard version of a system call read( ) from the system call block 224. The read( ) is not accessed directly, but through an API call from the API block 222 that creates a known size data block for the read( ) system call.

Following the identification of the file footprint 226, the data transfer module 220 receives the incoming data of the data file 210 from the host device 204 into the file footprint 226 using DMA. The data transfer is performed without any intervention by the SoC processor 212. In an embodiment, the external device memory media 214 is specified as an MTP device. The data transfer follows the MTP protocol. In addition, the file system driver of the external device 202 locks the FAT32 file system 216 to prevent another simultaneous access to the file footprint 226. The locking is implemented through a non-standard version of the ioctl( ) system call of the FAT32 file system 216, which requires an open file descriptor. The file footprint 226 created for the data transfer will be opened in "read only" mode and will not be accessed for "write" operation. The detailed function of the API calls is explained in the following method 300 of the present disclosure.

Figure 3:
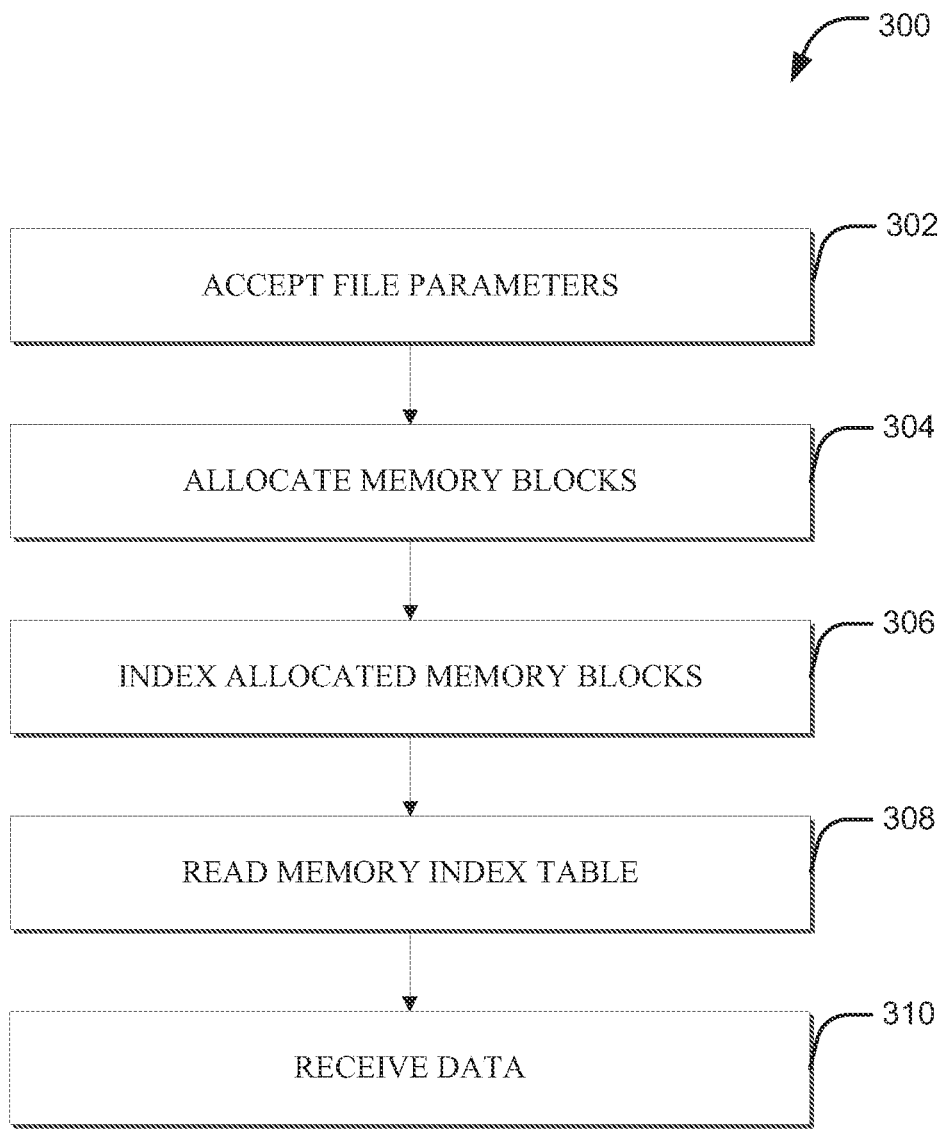
FIG. 3 is a flowchart of an exemplary method for transferring data between a host device and an external device.

FIG. 3 is a flowchart of the exemplary method 300 for transferring data between a host device and an external device. The method 300 overcomes the disadvantages of the conventional methods by employing extensions to the FAT32 file system to create a file footprint on the external device for transferring data, avoiding any modifications in the external device's system kernel and without introducing new system calls. Instead, the method 300 uses and overloads read( ), ioctl( ) and fallocate( ) system calls of the FAT32 file system to perform in a non-standard manner. The system calls read( ), ioctl( ) and fallocate( ) behave entirely conventionally.

The external device employing a FAT32 file system and the host device are connected via a USB port. Alternatively, the method 300 may operate on the exemplary system 200 discussed in connection with FIG. 2.

The host device includes a data file, which is to be transferred to the external device. At step 302, the method 300 accepts one or more parameters related to the incoming file data from the host device. The parameters may include filename, size, type, creation date, author or any other similar parameters. Further at step 304, the method 300 allocates memory blocks for the incoming file data on memory media of the external device based on the parameters. Subsequently, the allocated memory blocks are indexed on a memory index table to create a file footprint at step 306.

A non-standard implementation of the fallocate( ) system call calculates the number of disk clusters that are required for the incoming data based on the received parameters and performs FAT table management that includes indexing the allocated memory blocks on the memory index table. Further, the system call fallocate( ) calls a modified version of a subroutine fat_add_cluster( ) that adds the allocated clusters to an inode record, but does not mark the inode as dirty and force a zero-filled write of all the blocks. The fallocate( ) system call is not called directly but through an API, which calls fallocate( ) in a non-standard mode and reserves the memory blocks.

The file system driver includes the file distribution or sector information on the external device memory, which reads the memory index table to identify the freshly created file footprint at step 308. Specifically, the method 300 accesses the sector/cluster mappings for the file via a non-standard version of the read( ) system call. The read( ) is not accessed directly, instead through an API call that creates a known size data block for the read( ) system call, and initializes it such that its first bytes contain a clear signature that the call is being used in the non-standard way. The API call places two 16-bit signature codes at the head of an array, and then calls read( ) with the array, and a "Special Magic Number" as calling parameters. The "Special Magic Number" is a unique value that would never be present in the standard use of the call. If the "Special Magic Number" and the two 16-bit signature codes match, the read( ) call is trapped and returns the cluster data rather than performing an actual read. This step ensures that the standard read( ) does not accidentally falls into the non-standard operation mode.

Following the file footprint identification at the step 308, the method 300 receives the incoming data from the host device into the file footprint at step 310 using DMA technique.

In the present embodiment, the external device processor or SoC is not involved during the data transfer. Additionally, throughout the data transfer, the SoC may be operable to execute various other procedures associated with the external device, such as making phone calls, playing media, transferring data to other memories and many more similar operations, providing an optimal division of work for high throughput transactions.

In another embodiment, the SoC may act as an intermediate device between the host device and the memory medium of the external device during the data transfer. For example, this data transfer may involve updating the external device, or the stored files or contacts, as desired. During data transfer, the SoC may have limited functionalities as a significant portion of the processor's processing capability may be used. For example, where the external device is a cell phone, the SoC may not be able to perform calls or other activities while performing data transfer.

The data transfer follows MTP protocol in the present embodiment. Those skilled in the art will understand that similar protocols known in the art may also be employed without departing from the scope of the present disclosure. The data transferred may include any known data type, as desired. For example, a user may wish to store media, documents, spreadsheets, contact details, or other similar data on the memory media of the external device. Further, the data transfer may take place at a USB high or super speed transfer rate. USB transfer rates may refer to speeds greater than the transfer rates offered by USB 1.1, 2.0, or 3.0 protocols.

In addition, the file system driver locks the FAT32 file system to prevent another simultaneous access to the file footprint. The locking is implemented through a non-standard version of the ioctl( ) system call. The file footprint created for the data transfer (sideloading) will be opened in "read only" mode and will not be accessed for "write" operation.

The API calls open the file footprint, perform the action, and then close the file again, allowing the file system to open the file in "write-only" mode after the allocation call and "read-only" mode after the read call.

The methods and systems of the present disclosure describe a technique of optimal sideloading (or data transfer) to an external device from a computing device that involves creating a file footprint in the external device without initializing the file with zeros. Particularly, the methods and systems of the present disclosure illustrate extensions to the FAT32 file system to achieve the desired result. Whereas most file system methods work in the context of the operating-system kernel of the host computer, the disclosed methods work in the context of the data transfer process involving both the host computer and the external device. The methods allow performance optimizations usually seen with DMA. Part of the novelty in this disclosure is that the file system methods intentionally leave both file system and kernel in an inconsistent state that is resolved during the data transfer process.

Further, the methods and systems avoid any modifications in the system kernel and introduction of new system calls, as the new system calls would require widespread changes that cannot be localized to a single kernel module. Instead, the methods and systems use and overload read( ), ioctl( ) and fallocate( ) system calls. As no existing code in the FAT32 file system driver is changed, the driver functions without any deviations while working outside the sideloading context.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

The specification has described extensions to the FAT32 file system for performing data synchronizing between two devices. The specification has set out a number of specific exemplary embodiments, but persons of skill in the art will understand that variations in these embodiments will naturally occur in the course of embodying the subject matter of the disclosure in specific implementations and environments. For example, the external device described can be a digital camera, a mobile phone, personal digital assistant, or other similar device. It will further be understood that such variations and others as well, fall within the scope of the disclosure. Neither those possible variations nor the specific examples set above are set out to limit the scope of the disclosure. Rather, the scope of claimed invention is defined solely by the claims set out below.

We claim:

1. A method for transferring data between a host device and an external device having a FAT32 (File Allocation Table) file system, the method comprising:
   accepting parameters for an incoming data file from the host device;
   allocating memory blocks for the incoming data file on the external device based on the parameters, wherein the allocated memory blocks are not initialized;
   creating a file footprint by indexing the allocated memory blocks in a memory index table;
   reading the memory index table to identify the file footprint; and
   receiving the incoming data file from the host device into the file footprint using a direct memory access (DMA) data transfer techniques, wherein the file footprint specifies the sector/cluster mappings for storing the data file on the external device.

2. The method of claim 1, wherein the parameters include one or more of:
   filename;
   size;
   type;
   creation date; or
   author.

3. The method of claim 1, wherein the host device and the external device are connected via a Universal Serial Bus (USB) port.

4. The method of claim 1, wherein the allocating step is performed using an Application Programming Interface (API) coupled to the FAT32 file system.

5. The method of claim 1, wherein the reading step is performed using an Application Programming Interface (API) coupled to the FAT32 file system.

6. The method of claim 1 further includes locking the FAT32 file system during the data transfer to prevent another simultaneous access to the file footprint.

7. A data transfer system for an external device including a memory media and a processor configured to execute a FAT32 file system comprising:
   a memory management module configured to:
      receive parameters for an incoming data file;
         allocate memory blocks for the incoming data file based on the parameters, wherein the allocated memory blocks are not initialized; and;
         create a file footprint by indexing the allocated memory blocks in a memory index table; and
   a data transfer module configured to:
      read the memory index table to identify the file footprint; and
      receive the incoming data file into the file footprint using a direct memory access (DMA) data transfer techniques, wherein the file footprint specifies the sector/cluster mappings for storing the data file on the external device.

8. The system of claim 7, wherein the parameters are one or more of:
   filename;
   size;
   type;
   creation date; or
   author.

9. The system of claim 7, wherein the data transfer system follows a Media Transfer Protocol (MTP).

10. The system of claim 7 further includes a Universal Serial Bus (USB) port configured to operatively couple the external device to a host device.

11. The system of claim 7, wherein the host device is a computing device.

12. The system of claim 7 further includes an Application program Interface (API) that sends commands to the FAT32 system to allocate memory blocks for the incoming file and read the memory index table.

13. The system of claim 7, wherein the external device is a portable device having memory.

14. The system of claim 7, wherein the external device is a cellular phone.

15. A system for transferring data, the system comprising:
   a host device, wherein the host device includes a host memory;
   an external device in communication with the host device, wherein the external device includes a memory configured to use a FAT32 (File Allocation Table) file system, further comprising:
      a memory management module configured to:
         accept parameters relating to an incoming data file from the host device;
         allocate memory blocks on the external device for the incoming data file based on the parameters, wherein the allocated memory blocks are not initialized; and create a file footprint by indexing the allocated memory blocks in a memory index table; and a data transfer module configured to:

read the memory index table to identify the file footprint; and receive the incoming data file into the file footprint using a direct memory access (DMA) data transfer techniques, wherein the file footprint specifies the sector/cluster mappings for storing the data file on the external device.

16. The system of claim 15, wherein the external device is a portable device having memory.

17. The system of claim 15, wherein the host device is a computing device.

* * * * *